United States Patent [19]

Mehta

[11] Patent Number: 5,443,349
[45] Date of Patent: Aug. 22, 1995

[54] UNLOADING LEVER FOR HANDTRUCK

[76] Inventor: Maheshkumar M. Mehta, P.O. Box 1472, Rockingham, N.C. 28379

[21] Appl. No.: 142,932

[22] Filed: Oct. 29, 1993

Related U.S. Application Data

[63] Continuation of Ser. No. 779,458, Oct. 18, 1991, abandoned.

[51] Int. Cl.$^6$ .............................................. B62B 1/06
[52] U.S. Cl. ................... 414/490; 280/47.28; 280/47.29
[58] Field of Search ............... 414/490; 280/47.28, 280/47.27, 47.29

[56] References Cited

U.S. PATENT DOCUMENTS

| | | | |
|---|---|---|---|
| 2,649,219 | 8/1953 | Nielsen | 414/490 |
| 3,308,978 | 3/1967 | Smith, Jr. | 414/490 |

FOREIGN PATENT DOCUMENTS

| | | | |
|---|---|---|---|
| 2742101 | 3/1979 | Germany | 414/490 |

*Primary Examiner*—Charles A. Marmor
*Assistant Examiner*—Sherry Lynn Estremsky

[57] ABSTRACT

A manually operated hand truck with an improved unloading lever having a forward lever section, a transverse push plate rigidly mounted on the forward lever section, a foot-actuated pedal portion opposite the forward end lever section, a middle section joining the forward lever section and foot-actuated pedal portion, a tube attached to the middle section at its junction with the forward lever section and foot-actuated pedal portion, whereby the forward lever section and carried transverse push plate is moved forwardly and upwardly upon actuation of the pedal portion to discharge the load.

1 Claim, 1 Drawing Sheet

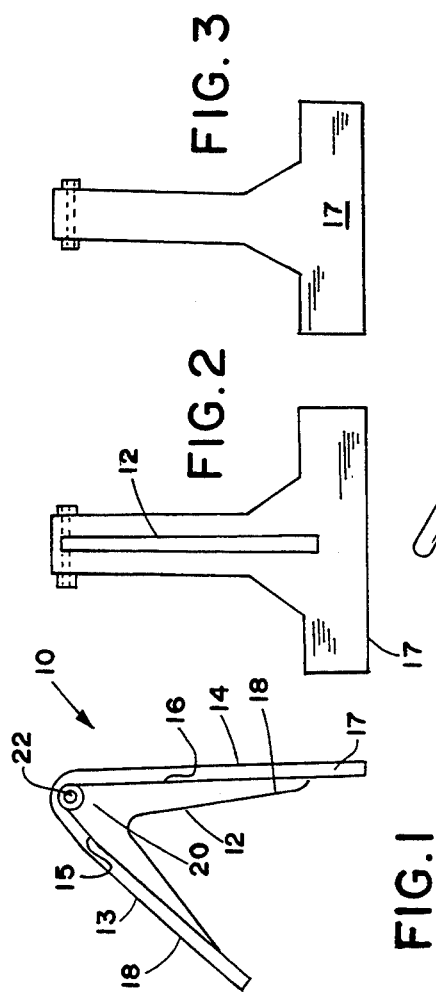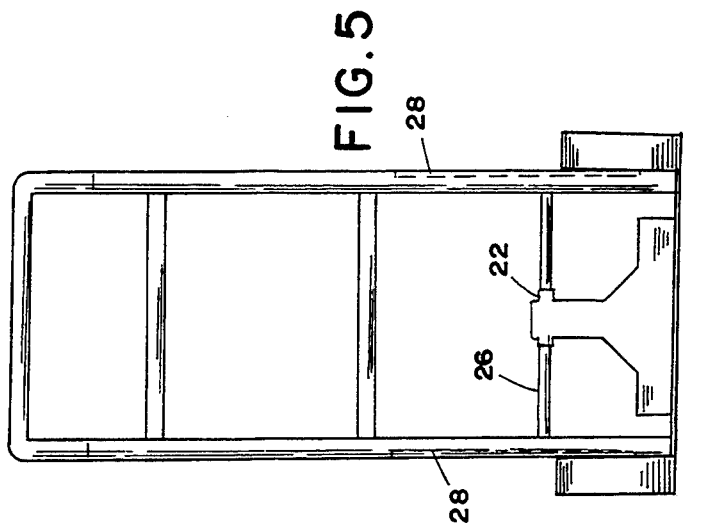

UNLOADING LEVER FOR HANDTRUCK

This application is a continuation application of my pending application Ser. No. 07/779,458 filed Oct. 18, 1991, now abandoned.

BACKGROUND OF THE INVENTION

1. Field of the Invention

The present invention relates to hand trucks and more particularly to hand trucks having loading levers.

2. Description of the Prior Art

In prior art relating to hand truck unloading devices, a variety of push lever mechanisms have been developed. These lever means are designed to apply pressure in a substantially horizontal direction against the load to be removed from the hand truck. Typical of such devices are the disclosures of U.S. Pat. Nos. 2,406,158; 2,452,258; 2,476,202; 2,838,193; and 3,844,433. Where heavy loads are involved considerable pressure is required to force the load off the loading tongue of the hand truck. For that reason, operators tend to tilt the load at the top, forward and away from the hand truck, in an attempt to free the load from the truck. This motion can cause the load to fall if the operator loses control due to the heavy weight involved.

Other mechanisms of the prior art utilize a separate hand operated lever such as shown in U.S. Pat. No. 2,682,348; however, these devices require the operator to remove one hand from the hand truck to operate the separate hand lever. Again, this presents the possibility of the operator losing control due to the heavy weight involved.

SUMMARY AND OBJECTIVES OF THE INVENTION

The primary objective of the present invention, which will be described subsequently in greater detail, is to provide a manually operated two-wheel hand truck with a new and improved unloading lever. To attain this objective a representative embodiment of a hand truck makes use of a rigid, one piece unloading lever comprising a forward lever section, a transverse push plate rigidly mounted on the terminal end of the forward lever section, a foot-actuated pedal portion opposite the forward lever section, a middle section between the forward lever section and the foot-actuated pedal section joining these two sections together, and a hollow sleeved tube externally attached at its midpoint to the middle section at its junction with the foot-actuated pedal section for the insertion of a support shaft. The unloading lever is attached to the hand truck by a transverse shaft mounted between the two side braces of the hand truck and extending through the sleeved tube. Simultaneous forward and upward pressure is exerted on the load upon actuation of the pedal section due to its configuration and the angle of the direction of the pressure being applied.

Thus, there has been outlined, rather broadly, the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limiting. As such, those skilled in the art will appreciate the concept, upon which this disclosure is based, may readily be utilized as a basis for designing other structures, methods and systems in carrying out the several purposes of the present invention. It is important that the claims be regarded as including such equivalent construction insofar as they do not depart from the spirit and scope of the present invention.

It is, therefore, an object of the present invention to provide a new and improved unloading lever for a manually operated two-wheeled hand truck which has all the advantages of prior art unloading devices and none of the disadvantages.

Another object of the present invention is to provide a new and improved unloading lever that enables the operator to keep the hand truck squarely on the ground and with both hands controlling it during the operation of the unloading lever by his or her foot.

Yet another object of the present invention is to provide a new and improved unloading lever for a hand truck that is simple in construction, economical to manufacture and reliable to use.

These, together with other objects of the invention, along with the various features of novelty which characterize the invention, are noted with particularity in the claims annexed to and forming a part of this disclosure. For a better understanding of the invention, its operating advantages, and the specific results obtained by its uses, reference should be made to the following detailed specification taken in conjunction with the accompanying drawings in which like characters of reference designate like parts throughout the several views.

BRIEF DESCRIPTION OF THE DRAWINGS

FIG. 1 is a side elevational view of the unloading lever comprising the present inventive concept;

FIG. 2 is an end elevational view of the lever shown in FIG. 1;

FIG. 3 is a front elevational view of the lever shown in FIG. 1 and FIG. 2;

FIG. 4 is a side elevational and sectional view of the unloading lever connected to the manually operated two-wheeled hand truck and FIG. 5 is a front elevational view of the hand truck and mounted unloading lever shown in FIG. 4.

DETAILED DESCRIPTION OF THE SPECIFICATION

Referring now to the drawings, FIGS. 1, 2 and 3 show different views of the one piece unloading lever shown generally as 10 which is formed of a rigid V-shaped member 12 capped with flanges 13, 14 along member edges 15, 16. A transverse push plate 17 connects with and lies in the plane of flange 14. A foot-actuated pedal portion 19 is positioned opposite forward end 18 of member 12, and a middle section 20 joins push plate 17 and end 18 with foot-actuated pedal portion 19. A hollow sleeved tube 22 lies in middle section 20 at the tip of V-shaped member 12.

In an embodiment of the invention, the unloading lever is mounted on a manually operated hand truck of the type known in the art, it being understood that any form of hand truck may be utilized in practicing the invention. Such hand trucks typically comprise a frame with vertical side bars, sloping axle braces mounted to the side bars, an axle arranged transversely of the frame between the axle braces, wheels carried by the axle and a rigid loading tongue mounted to the bottom of the side bars.

Referring now to FIG. 4, unloading lever 10 is shown mounted on a two-wheel hand truck shown generally as 24 of a design commonly found in the prior art. A transverse shaft 26 is attached at each of its terminal ends to the truck side bars 28 and extends through sleeve tube 22 of lever 10, thus allowing free pivotal movement of unloading lever 10. The push plate 17 and flange 14 lie in a plane parallel to side bars 28 when member 12 is in the inactive condition.

Transverse push plate 17 is of an appropriate width to fit inside the frame of the hand truck and may be of any suitable form that is capable of sufficient surface contact with the load to provide even pressure against the load. Such form may be a blade or plate.

The rigid one-piece construction of unloading lever 10 and its V-shaped configuration enable the operator to exert pressure forward and in a slightly upwardly direction (see arrow) against the load, thereby facilitating its removal from loading tongue 30.

The angle formed by the intersection of foot-actuated pedal 19 and forward portion 18 of member 12 is from about 40 to 50 degrees, preferably around 45 degrees. This angular configuration causes transverse plate 16 to move both forward and upward against the load so that a slight lifting action is applied along the horizontal thrust. The lifting action amounts to a 15 to 20 degree pressure angle thrust above the horizontal. Heavy loads are thereby more easily removed from loading tongue 30 since load pressure upon the tongue is gradually released by the upward pressure and the forward pressure as the load is moved off the tongue. Since the lifting action is applied at the base of the load and not at the top, the possibility of the load falling while being unloaded is substantially reduced.

With respect to the above description, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed herein. Therefore, the foregoing is considered as illustrative only of the principles of the invention. Further, since numerous modifications and changes will readily occur to those skilled in the art, it is not desired to limit the invention to the exact construction and operation shown and described. All suitable modifications and equivalents that fall within the scope of the appended claims are deemed within the present inventive concept.

What is claimed is:

1. In a hand truck for carrying an article, the hand truck having a frame with vertical side bars, sloping axle braces mounted to the side bars, an axle arranged transversely of the frame between the axle braces, wheels carried by the axle and a rigid loading tongue mounted to the bottom of the side bars, the improvement comprising: a transverse shaft joining the vertical side bars; and a one-piece freely suspended V-shaped unloading lever movable from an inactive position to a load engaging position having a forward end including a flange secured to the forward end, a transverse flat rectangularly shaped solid push plate rigidly mounted adjacent the forward end parallel to and in the plane of the flange, the flange and transverse push plate being in the plane of the side bars when the lever is in the inactive position, a foot-actuated pedal portion opposite the forward end, and a middle section joining the forward end and the foot-actuated pedal portion and having a hollow sleeve tube cooperatively receiving the transverse shaft to provide free rotational movement of the unloading lever about the transverse shaft at the middle section sleeve tube, the forward end and the foot-actuated pedal portion being of substantially the same length, the unloading lever being responsive to force exerted against the foot-actuated portion to apply simultaneous forward and upward pressure at the push plate against the article to be unloaded wherein the angle formed by the intersection of the foot-actuated pedal portion and the forward end is 40° to 50° in the unloading lever forward end upward pressure thrust the article to be unloaded is at an angle of 15° to 20° upwardly from the horizontal, the unloading lever engaging the hand truck solely at the transverse shaft.

* * * * *